UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

CELLULOSE-ESTER COMPOSITION AND METHOD OF MAKING THE SAME.

1,342,601.   Specification of Letters Patent.   Patented June 8, 1920.

No Drawing.   Application filed February 7, 1918. Serial No. 215,897.

*To all whom it may concern:*

Be it known that I, PAUL C. SEEL, a citizen of the United States of America, residing at Rochester, in the county of Monroe and State of New York, have invented certain new and useful Improvements in Cellulose-Ester Compositions and Methods of Making the Same, of which the following is a full, clear, and exact specification.

This invention relates to a new composition of matter and method of making the same, in which a cellulosic compound is combined or mixed with other substances so that the resulting product can be advantageously used in the plastic and analogous arts, such for instance as sheet or film manufacture and varnish manufacture.

One object of my invention is to provide a composition of matter, the inflammability of which is reduced to an important extent so that it becomes relatively safe in use. Another object is to provide a composition which may be made into permanently transparent strong and flexible sheets or films of desired thinness, that are substantially waterproof, are unaffected by ordinary photographic fluids, and possess the desired properties of a support for sensitive photographic coatings. Another object of my invention is to produce a composition of matter capable of easy manipulation in the plastic and film making, or varnish making or allied arts; which will not injure or be injured by the substances with which it is associated during manufacture, storage, or use. Still another object of my invention is to provide a process for compounding such composition of matter. Further objects will hereinafter appear.

I have discovered that a composition of matter having the desirable qualities hereinabove enumerated can be obtained by mixing or compounding a cellulose ester, like cellulose acetate, with chlorin substitution products of the carbopolycyclic compounds or differently expressed chlor-nucleo substitution products of the hydrocarbons $C_{2n} H_{n+3}$ and their homologues, where $n$ is 5 or more, such as chlorinated naphthalenes or anthracenes, which are only slightly volatile or non-volatile at ordinary temperatures. In the preferred species of my invention I select the non-inflammable bodies. This compounding is best performed by mixing the acetyl cellulose and the chlorinated compounds with a solvent common to both, such as acetone. Bodies of slight volatility, which enhance the plasticity or flexibility, may also be present, such, for example, as the aliphatic alcohols of more than two carbon atoms like butyl alcohol or fusel oil.

The volatility of the chlorinated compound should be only slight, after its incorporation in my composition, so that the loss of the small quantity, which might be volatilized under conditions prevailing during its use and during the desired life of the film, will not make the latter unserviceable. As applied to these compounds the term "non-inflammable" means, of course, only practical non-inflammability, the chlorinated bodies themselves not acting normally to propagate combustion therein but rather being flame-resisting. They impart this quality to a very useful degree to the composition in which I incorporate them.

The following substances may be mentioned as two typical examples of the chlorinated carbocyclic compounds, which I can employ in exercising my invention. One of them is an almost colorless oily liquid consisting principally of alpha-monochloronaphthalene but containing small amounts of more highly chlorinated derivatives. It boils between 242° C. and 290° C., the bulk passing over between 250° C. and 275° C. The other is a translucent waxy crystalline body consisting of a mixture of higher chlorinated naphthalenes, chiefly tetrachloronaphthalenes. It has a boiling range of 310° C. to 340° C. Both of them are practically non-inflammable, the waxy body being especially so.

In carrying out one illustration of my invention I incorporate in 90 parts of acetone, 20 to 30 parts of cellulose acetate (of the acetone-soluble species) 4 to 7 parts of the oily chlorinated naphthalene substance mentioned hereinabove, and 4 to 7 parts of butyl alcohol or fusel oil. The ingredients are mixed to form a homogeneous solution or flowable mass and filtered if desired.

Another example of my invention comprises incorporating in 90 parts of acetone, 20 to 30 parts of acetone-soluble cellulose acetate, 4 to 7 parts of the waxy chlorinated naphthalene substance described above, and 4 to 7 parts of butyl alcohol or fusel oil, the wax and the alcohol or fusel oil being mixed with 8 to 14 parts of amyl acetate before being added to the acetone. The ingredients are mixed thoroughly until a homogeneous solution or flowable mass results, which may be filtered if desired. The butyl alcohol mentioned in the above examples may be any of the isomers comprised under that broad term or a mixture thereof, the degree of purity being that present in the ordinary commercial forms.

Both of these solutions are sufficiently thick and viscous to be properly flowed during sheet or film manufacture, the acetone volatilizing, but not too rapidly to impair the product. The small amount of amyl acetate in the second illustration is also volatile. The resulting films containing the other unvolatilized ingredients are so flexible, smooth, transparent and uniform that they may be used for any usual or preferred purpose. Due to their greatly reduced inflammability they form excellent "safety" motion picture film supports. They are practically waterproof and unaffected by ordinary photographic chemicals. The chlorinated compounds, having the halogen in the ring or closed chain, are so stable that they do not liberate chlorin or injure metal or other parts with which they come in contact during manufacture and moreover do not chemically re-act with or injure the other bodies that they are associated with in the solution or film.

My experiments show that the chlorinated carbocyclic compounds may also be usefully combined with any of the other available cellulose esters, like cellulose nitrate. For instance, I may add either the oil or wax described hereinabove to a mixture containing cellulose nitrate, a solvent such as acetone and methyl alcohol and small amounts of substances like camphor, fusel oil or butyl alcohol of very small volatility. The wax is ordinarily dissolved in amyl acetate before being added to the mixture. For a fuller description of this cellulose nitrate species of my invention, reference should be made to my co-pending application, Serial No. 215,899, filed of even date herewith.

While I have hereinabove disclosed certain compositions and processes by way of example, my invention is not limited thereto nor to the proportions given therein, my experiments indicating that the proportions may be widely varied from those given and equivalent substances may be substituted without departing from the principle of my invention as defined in the appended claims.

It will be noted that the above advantages are obtained in spite of the fact that my compositions are substantially free from camphor.

Having thus described my invention what I claim as new and desire to secure by Letters Patent is:

1. A composition of matter comprising cellulose acetate and a chlor substitution product of naphthalene.

2. A composition of matter comprising cellulose acetate, a chlorin substitution product of naphthalene, and a volatile solvent common to both.

3. A composition of matter comprising cellulose acetate, acetone, and an oily chlorinated body derived from naphthalene and comprising monochloronaphthalene, mixed with small amounts of the higher chlorinated derivatives and boiling between 242° to 290° C.

4. A composition of matter comprising cellulose acetate, a chlorin substitution product of naphthalene, a solvent common to both and butyl alcohol.

5. A composition of matter comprising cellulose acetate, a chlorin substitution product of naphthalene, acetone, and butyl alcohol.

6. A composition of matter comprising 90 parts of acetone, 20 to 30 parts of acetone-soluble cellulose acetate, 4 to 7 parts of an oily chlorinated naphthalene derivative, boiling between 242° and 290° C., and composed principally of monochloronaphthalene, and 4 to 7 parts of butyl alcohol.

7. A composition of matter comprising cellulose acetate and a chlor-nucleo substitution product of the hydrocarbons $C_{2n}H_{n+3}$ and their homologues.

8. A composition of matter comprising cellulose acetate, a chlor-nucleo substitution product of the hydrocarbons $C_{2n}H_{n+3}$ and their homologues, and a solvent common to both.

9. A composition of matter comprising cellulose acetate, a chlor-nucleo substitution product of the hydrocarbons $C_{2n}H_{n+3}$ and their homologues, and acetone.

10. As an article of manufacture, a sheet of deposited or flowed cellulose acetate containing a chlor-nucleo substitution product of the hydrocarbons $C_{2n}H_{n+3}$ and their homologues.

11. As a new article of manufacture, a sheet of deposited or flowed cellulose acetate containing a chlor-nucleo substitution product of the hydrocarbons $C_{2n}H_{n+3}$ and their homologues, and an organic body of only slight volatility which enhances the flexibility of the sheet.

12. A composition of matter comprising cellulose acetate, a chlor-nucleo substitution product of the hydrocarbons $C_{2n}H_{n+3}$ and their homologues, and an organic body of only slight volatility which enhances the plasticity and flexibility of the composition.

13. A composition of matter comprising cellulose acetate, a chlor-nucleo substitution product of the hydrocarbons $C_{2n}H_{n+3}$ and their homologues, and an aliphatic alcohol of only slight volatility having more than two carbon atoms.

14. The process of making a composition of matter of only small inflammability, which comprises combining cellulose acetate and a chlorin substitution product of naphthalene by the use of acetone.

15. The process of making a composition of matter of only small inflammability which comprises combining cellulose acetate and a chlorin substitution product of naphthalene by the use of acetone and butyl alcohol.

16. The process of making a composition of matter of only small inflammability which comprises combining cellulose acetate and a chlor-nucleo substitution product of the hydrocarbons $C_{2n}H_{n+3}$ and their homologues by the use of a solvent common to both.

Signed at Rochester, New York, this 25th day of January, 1918.

PAUL C. SEEL.